Jan. 17, 1961   C. VAN DER LELY ET AL   2,968,142
FARM IMPLEMENT
Filed Dec. 12, 1956   4 Sheets-Sheet 4
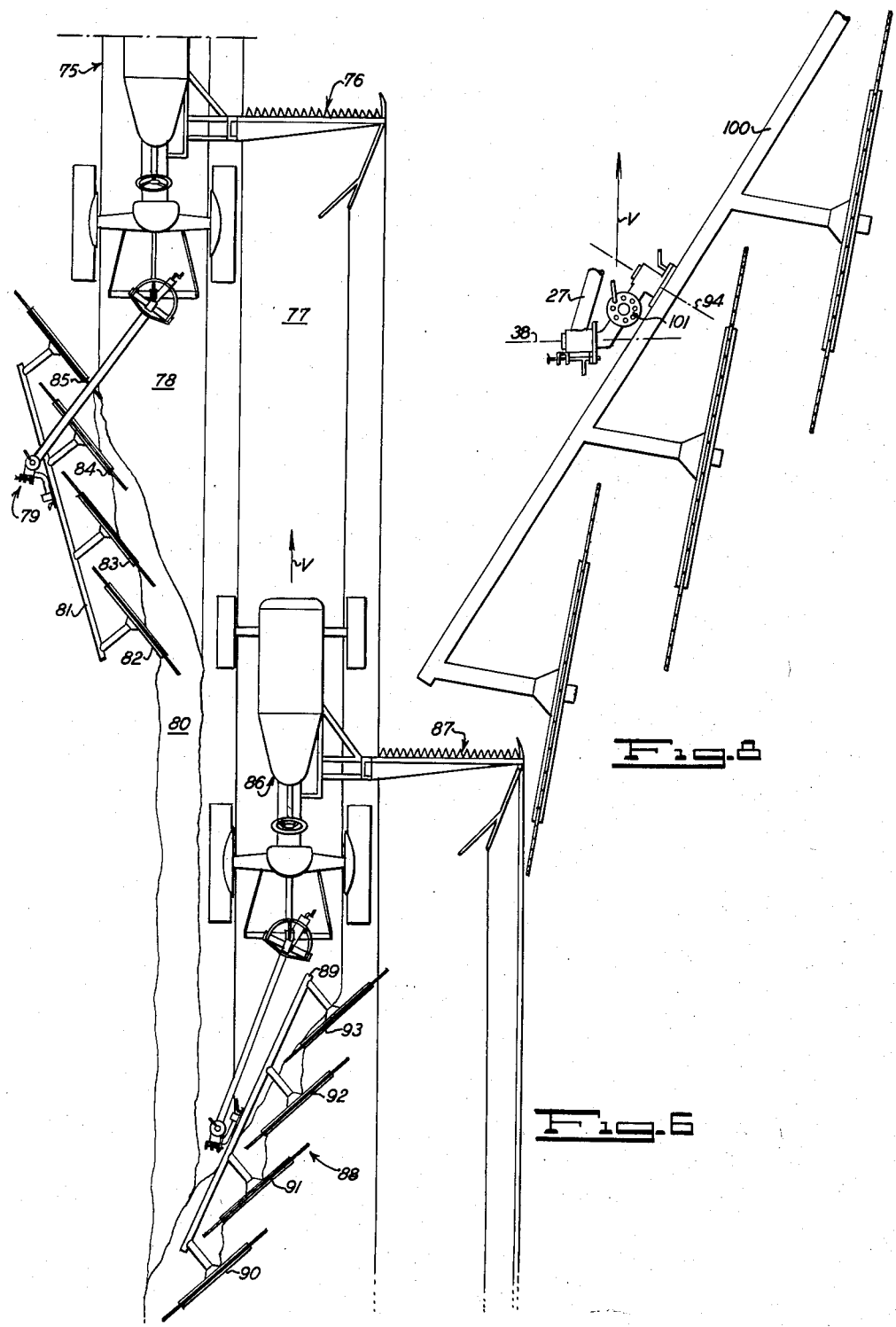

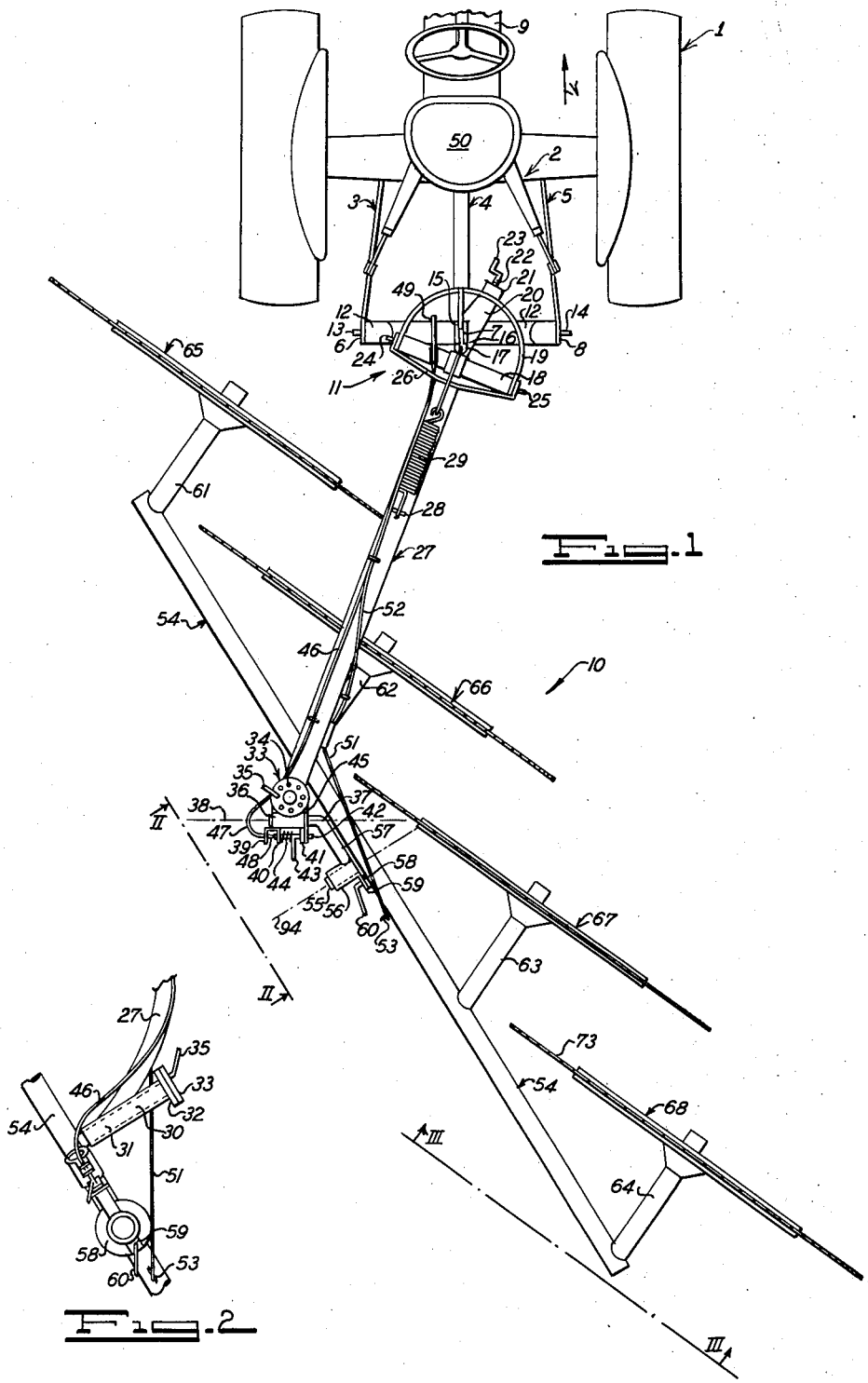

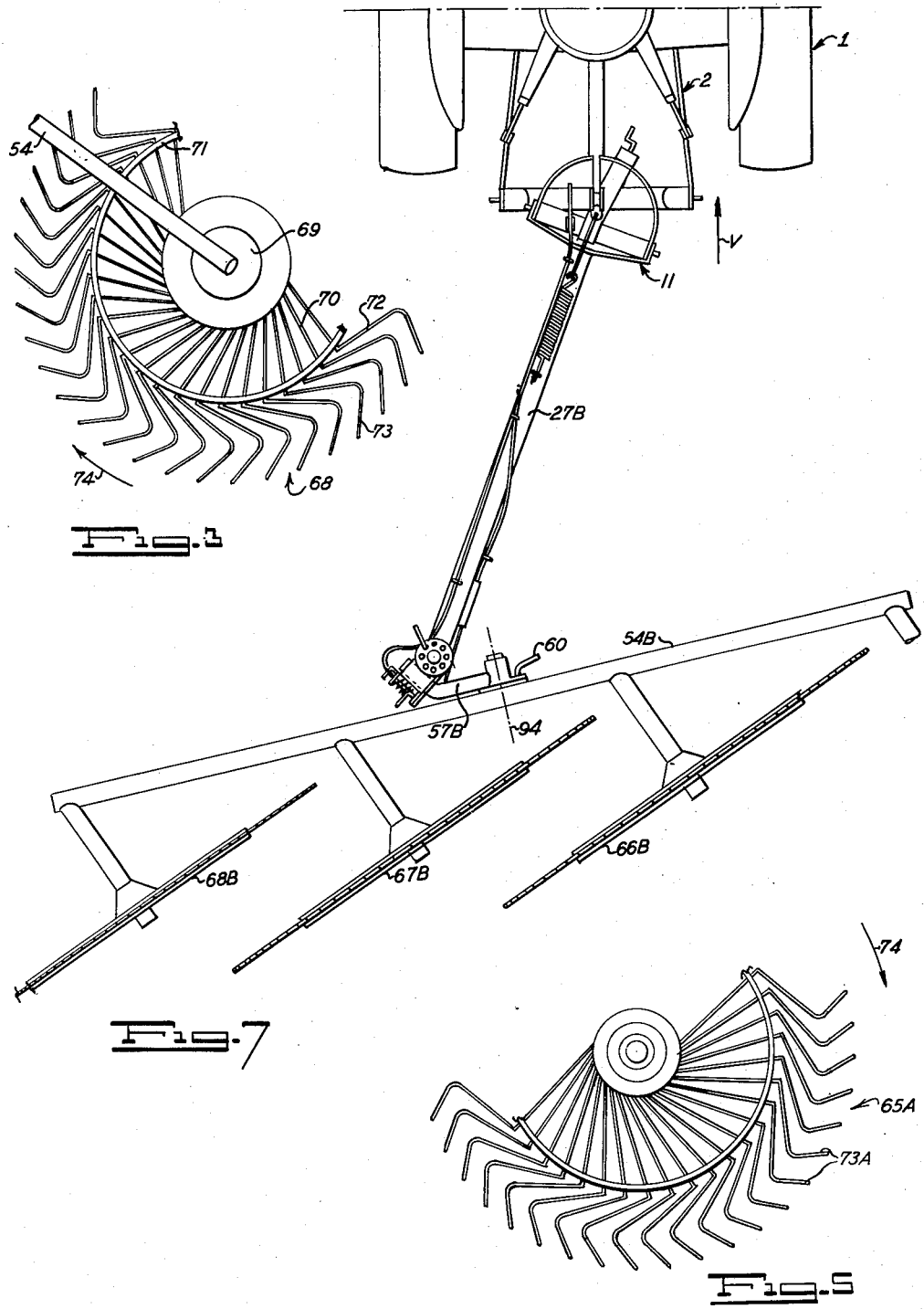

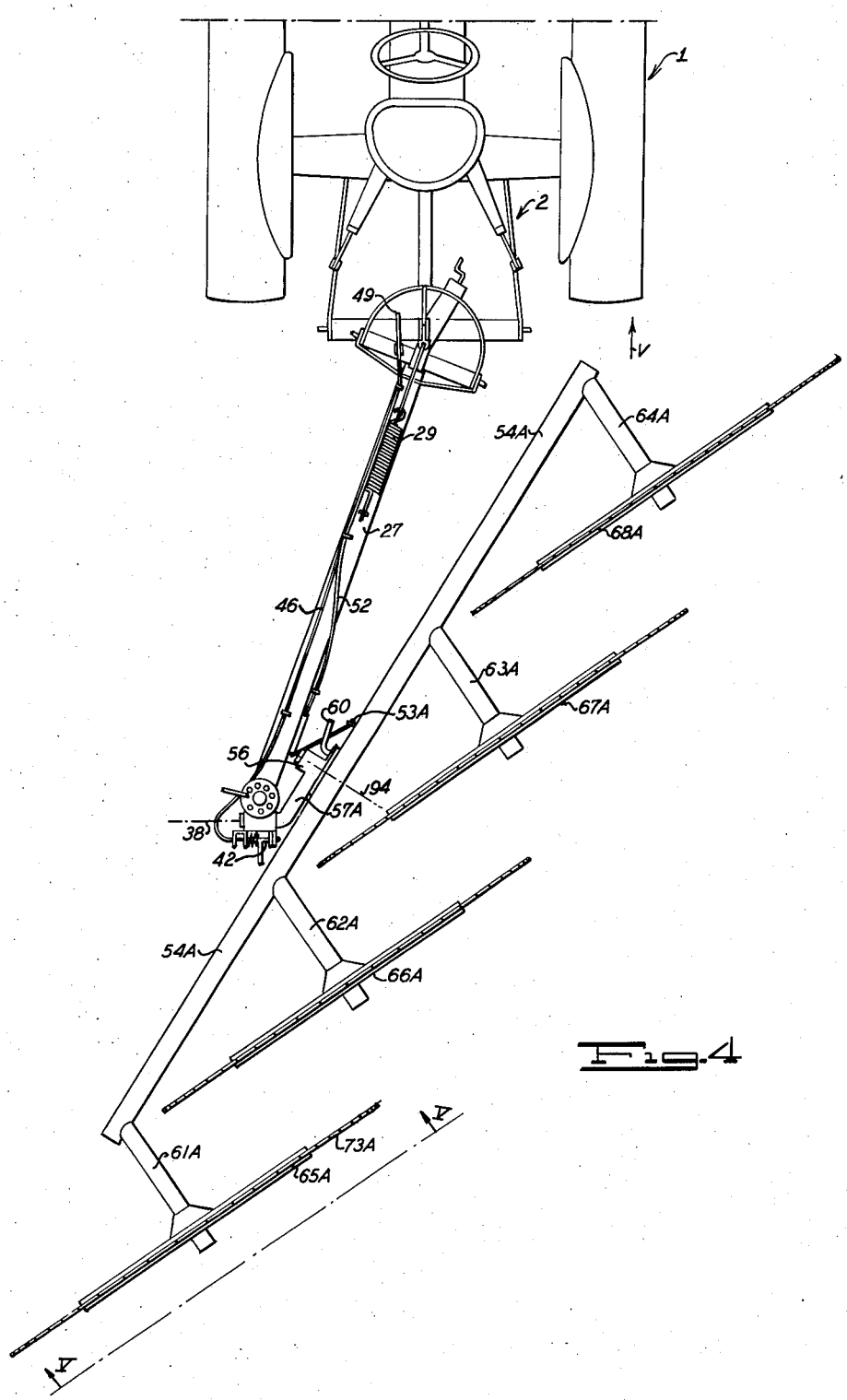

United States Patent Office 2,968,142
Patented Jan. 17, 1961

2,968,142
FARM IMPLEMENT

Cornelis van der Lely and Ary van der Lely, Maasland, Netherlands, assignors to C. van der Lely N.V.

Filed Dec. 12, 1956, Ser. No. 627,814

Claims priority, application Netherlands Dec. 13, 1955

6 Claims. (Cl. 56—377)

This invention relates to farm implements, and more particularly to farm implements adapted to different modes of operation.

Side delivery rakes are known which are built so that raked materials are delivered to one side such as, for example, toward the left. If this type of rake is to be adapted for delivery towards the right, the rake must be dismantled and then rebuilt according to the rake's mirror image. Disadvantageously, this type of operation requires so much time that known rakes do not effectively meet the demand for a rake with which it is possible to rake selectively in different directions.

Accordingly, it is an object of the invention to provide an improved farm implement which can be adapted to different modes of operation.

It is a further object of the invention to provide an improved side delivery rake for selective delivery in different directions.

Moreover, an object of the invention is to provide an improved farm implement which can easily and rapidly be converted from a side delivery rake to a tedder and which can also be simply adapted to different styles of operation.

In accordance with one embodiment of the invention, a side delivery rake is provided for adaptation to different working positions in which the implement delivers raked crop to alternate sides. As a feature of the invention, the tines of the rake wheels always extend backwards or oppositely to the direction of rotation of the rake wheels, with the crop in contact with opposite sides of the rake wheels in accordance with the selected working condition. The condition specified for the tines is obtained despite the working condition selected and this advantageously facilitates the depositing of the crop on the ground as the cut crop is traversed.

Moreover, during the conversion of the rake from one working condition to another, the rake wheels remain attached to the frame, the adjustment of these members being readily obtained in a manner which is to be described in detail.

Preferably a number of rake wheels are aligned in a row on a frame beam and, for enabling rapid conversion from one working position to another, the frame beam supporting the rake wheels is pivoted by a hinge member. As a result, the construction is extremely simple and economical.

Other features and details of embodiments of the invention will be hereinafter more fully described with reference to the accompanying drawings in which a preferred embodiment of the invention is illustrated by way of example and in which:

Fig. 1 is a plan view of a side delivery rake according to the invention, the rake being drawn by a tractor and being in a working position in which the crop is delivered to the right, Fig. 2 is a side elevational view of a detail of the rake of Fig. 1, viewed in the direction of the arrows II—II, Fig. 3 is a partial rear elevational view of the rake taken in the direction of the arrows III—III, only a part of the rear rake wheel being shown, Fig. 4 is a plan view of the rake shown in Fig. 1 in a second working position in which the rake delivers the crop to the left, Fig. 5 shows a rear elevational view of a part of the hindmost rake wheel of the rake in working position in accordance with Fig. 4 and taken according to the arrows V—V in Fig. 4, Fig. 6 represents two side delivery rakes in working position which are drawn by tractors provided with mowing beams, the foremost rake being in the working position shown in Fig. 1 and the hindmost rake being in the working position shown in Fig. 4, Fig. 7 shows a third working position of the side delivery rake of Figs. 1 and 4, the implement constituting a teddering device which is hauled by a tractor, and Figure 8 is a plan view of a side delivery rake in accordance with a further embodiment of the invention.

In Fig. 1, a tractor 1 is provided with a three-point lifting device 2 with three arms 3, 4 and 5 respectively having rearmost ends 6, 7 and 8.

The arms 3 and 5 are coplanar and can be moved upwardly by means of a motor 9 which supplies power for the tractor 1. A side delivery rake constructed in accordance with the invention is fixed to the ends 6, 7 and 8 by means of a coupling device 11 which constitutes a position control for the rake and is as well a part of the rake 10. The coupling device 11 comprises a substantially horizontal bar 12 which is provided with pins 13 and 14 which are supported rotatably by the ends 6 and 8. The lower end of a bar 15 is fixedly connected to the middle of the bar 12. The upper end of the bar 15 is hingedly connected to the end 7.

The vertical bar 15 carries two vertically spaced bearings 16 for a vertical axle 17 to which the central part of a horizontal bar 18 is attached. For securing the axle 17 and the bar 18 in a definite angular position with regard to the bars 12 and 15, the bar 18 is provided with a strip 19 which has the shape of a semicircle, the plane of which is horizontal and the center of which is situated on the center line of the axle 17, the bar 12 carrying an arm 20 with an extremity 21 extending upwardly. A threaded pin 22 can be screwed through a corresponding hole in the extremity 21 by means of a manually operated crank 23 so that the bent strip 19 can be clamped or otherwise secured such as by the use of suitable apertures through which the pin 22 extends.

The extremities of the horizontal bar 18 are provided with pins 24 and 25 about which the legs of a bow 26 pivot. The middle of the bow 26 is connected to a bent arm or traction beam 27 to which is fixed an eye 28. The lower extremity of a strong spiral spring 29 engages the eye 28 and the upper end of the spiral spring 29 is coupled to a high point on the axle 17 so as to exert a tensile force thereupon.

The rear-most part of the bent arm 27 (see Fig. 2) is rigidly connected to a vertical tube 30 which constitutes an elongated bearing for a vertical axle 31. The upper end of the tube 30 supports a disc 32 and the upper end of the axle 31 supports a disc 33. The discs 32 and 33 bear against each other and each is provided with holes 34. The axle 31 can be secured in a definite position with respect to the tube 30 by inserting a pin or locking means 35 through two corresponding holes 34 in the discs 32 and 33.

The lower end of the axle 31 is fixedly connected to a horizontal tube 36 in which a horizontal axle or pivot 37 is rotatably supported, tube 36 and axle 37 constituting a support means. The tube 36 defines a center line 38 and has three lugs 39, 40 and 41 having respective eyes (not shown). The eyes of lugs 40 and 41 constitute a guide for a locking pin 42 provided with a handle 43.

A spring 44 tends to remove the pin 42 insofar as possible from the eye 39. A strip 45 is fixedly mounted on the axle 37 and is provided with two apertures (not shown) situated on different sides of the center line 38, the pin 42 being able to extend through said apertures in two different positions of the axle 37 which are displaced by about 180°. The pin 42 can be removed out of the strip 45 by means of a Bowden or flexible cable 46 which constitutes a remote control means and is provided as is known with an outer casing one end 47 of which rests against the eye 39. The end 48 of the inner cable is connected to the pin 42. The cable 46 is positioned along the bent arm 27 and extends toward the bar 18 whereat the inner cable can be manually operated by means of a lever 49 from the seat 50 provided for the driver of the tractor 1. The lever 49 also operates the inner cable or flexible remote control device 51 of a Bowden cable 52, the rear end of the inner cable 51 being attached to an eye 53 mounted on a frame or frame beam 54.

The frame beam 54 is a substantially horizontal rectilinear tube and carries a horizontal pin 55 which is rotatable in a bushing 56. The bushing 56 is fixedly attached to the axle 37 by means of a bar 57. The pin 55 carries a disc 58 and the bushing 56 carries a lip 59, the elements 58 and 59 being locked to each other by a pin or locking means 60 during operation.

The frame beam 54 carries four horizontal axles 61, 62, 63 and 64 on which the rake wheels 65, 66, 67 and 68 are rotatably mounted. The row of overlapping rake wheels 65–68 is shown more clearly in Fig. 3 in which the rake wheel 68 is shown as including a hub 69 to which a large number of wires or spokes 70 are attached. The spokes 70 are situated in a plane perpendicular to the axle 64, but they do not extend radially. The spokes 70 carry a rim 71 which they engage by means of openings (not shown) in this rim. The steel wires constituting the spokes 70 are bent in an angular manner outside of the rim in order to provide supporting arms 72 for the tines 73 of the rake wheels. Each of the tines 73 is constructed of the same steel wire as are supporting arms 72 and spokes 70 and each has a nearly perpendicular position with regard to the corresponding supporting arm 72.

If the tractor and the rake move in the direction of the arrow V of Figure 1 with the rake wheels resting upon the ground, the rake wheels will be put into rotation and the crop lying on the ground will be delivered to the right. The rake wheel 68 will rotate in the direction shown in Figure 3 by the arrow 74. The points of the tines 73 extend backwardly with respect to said rotary movement, which is desirable in that a rising tine easily drops the crop which it is processing.

The above-described side delivery rake is shown in Fig. 4 in a second working position in which the implement constitutes a side delivery rake which delivers the crop to the left. This working position is obtained by rotating the frame beam 54 together with the rake wheels 65–68 and the bar 57 through an angle of substantially 180° about the center line 38. The rotated parts are designated in the new position by the same reference numerals as in Fig. 1, but are distinguished by the reference character A. The rake wheel 65A which is the rearmost rake wheel in the new working position, and the side elevational view of which is shown in Fig. 5, rotates during operation of the implement in the direction indicated by the arrow 74A and the tines 73A again extend rearwardly with regard to the rotary movement. Thus, in this working position as well, the rising tines of the rake wheels are positioned so as to drop the crop easily.

The conversion of the implement from the working position shown in Fig. 1 into the working position shown in Fig. 4 (or vice versa) can be achieved without interrupting the movement of tractor 1 by operation of the lever 49 after first raising the bent arm 27 and thus the center line 38 to a height sufficient to avoid interference by the ground. By moving the lever 49 forwardly, the locking pin 42 is removed from the strip 45 whereupon a force exerted on the eye 53 causes the eye 53 to rise so that the frame beam 54 rotates about the center line 38. As soon as the frame beam 54 reaches position 54A, the locking pin 42 is released so that the frame beam is locked in the new position. The implement is then set down again on the ground by means of the device 2. It will be observed that due to the spring 29, the rake wheels do not rest with their full weight upon the ground.

The frame beam 54 can as well be moved to positions parallel to its original position and to the left or right in Figs. 1 or 4. Upon the release of pins 22 and 35, the bent arm 27 can be angularly displaced with respect to the axle 17 and the axle 31 is rotated accordingly, following which the locking pins 22 and 35 are again used for fixing the position of the frame beam 54.

An example of the use of the side delivery rake of Figs. 1 and 4 is shown in Fig. 6. In the upper part of this figure a tractor 75 is provided with a mowing beam 76 which leaves a strip 77 of cut crop. The crop lying on a strip 78 which has been worked by a mowing beam during a preceding operation is delivered to the right by the side delivery rake drawn by the tractor 75 and forms a swath 80. The swath 80 can be displaced further to the right during subsequent operations so that it attains a great height. Therefore, it is important that the frame beam 81 be situated behind the rake wheels 82—85 so that the working position of the side delivery rake 10 described in Fig. 1 can be used.

A tractor 86 carrying a mowing beam 87 is also shown in Fig. 6. Tractor 86 can be used cooperatively with tractor 75, but alternatively tractor 75 may be used on successive strips. Behind the tractor 86 is located a side delivery rake 88 delivering the crop to the left so that the crop lying on the strip 77 is added to the swath 80. Afterwards the resulting swath can be picked up by a loading machine. If the tractor 75 is used for successive operations in which it delivers alternately to the left and right, the rake 88 is simply the rake 79 whose position is readily converted as previously described.

Additionally, the implement described can be used in a third working position as shown in Fig. 7, in which position the implement constitutes a tedding device with the tractor 1 drawing the implement in the direction of arrow V. In Fig. 7, the reference character B indicates a new position for elements previously described and designated.

The tedding device is connected by the coupling device 11 to the lifting device 2 of the tractor 1 and the bent arm 27B occupies a position which does not differ much from the position of the arm 27 in Figs. 1 and 4. The arm 27B carries the frame beam 54B in a position which can easily be obtained from the position of beam 54A in Fig. 4 by the turning of the frame beam through an angle of substantially 180° about the center line 94 of the bushing 56. For this purpose, the locking pin 60 is previously released and is afterwards secured.

It will be readily understood that the rake wheels 65B–68B thus acquire new positions but that the points of the tines still extend rearwardly with regard to the direction of rotation of the rake wheels. In the working position shown in Fig. 7, the rake wheels work the crop lying on four adjacent strips of land independently of one another.

A very simple manner for converting the rake of Fig. 1 into the tedding device of Fig. 7 includes the turning of the bar 57 through an angle of 180° about the center line 38 into the position indicated by the bar 57B. With the locking pins 42 and 60 released, the frame beam 54 maintains a substantially horizontal position so that the bushing 56 turns 180° with regard to the frame beam 54. Adjusting the working width is possible with the pin 35 temporarily removed to permit rotation of the axle 31. The tedder can be controlled to deliver to the right or left since the side delivery rake of Fig. 4 which delivers to the left can be converted into a tedding device delivering to the right.

By changing the delivery of a side delivery rake from right to left by the rotation of beam 54 (according to Fig. 1) about the center-line 38, the working width of the side delivery rake remains constant. This is a result of the position of the center-line 38 which is situated transversely to the travelling direction. However, if one changes the working width of the side delivery rake of Fig. 1 by a rotation of the beam 54 about the axle 31, the center-line 38 arrives at a position in which the angle between the travelling direction of the device and the center-line is less than 90°. If the beam 54 is turned from the new position around the center-line 38, the working width will be different in the working position in which the side delivery rake delivers the crop to the left. To obtain the original working width, the beam must be turned again about the axle 31. To improve these circumstances the vertical hinge-axis 31 is positioned between the horizontal axes 38 and 94 in the device according to Fig. 8 so that the center-line 38 can be kept transverse to the travelling direction after an alteration of the working width due to the rotating of the beam 100 about the vertical axis 101. Thus, in different working positions the working width can readily be maintained constant or varied as desired.

There will now be obivous to those skilled in the art many variations of the devices shown which do not depart essentially from the spirit of the invention as defined in the claims which follow.

What is claimed is:

1. An implement, for displacing material lying on the ground, said implement having a normal direction of travel and comprising a row of overlapping rake wheels, a frame operatively associated with and supporting the row of rake wheels in oblique relation to said direction of travel, support means operatively disposed intermediate the ends of said frame and including a substantially horizontal pivot means transverse to said direction, said frame being rotatably mounted on said pivot means for movement between different positions, and locking means operatively associated with said frame and said pivot means to fix said frame on said pivot means.

2. An implement as claimed in claim 1 comprising a bar on said pivot means and parallel to said frame, and a pin perpendicular to said bar and frame and operatively associated therewith to couple the frame to said bar.

3. An implement as claimed in claim 1 comprising a flexible remote control means operatively associated with said frame to pivot the latter on said pivot means.

4. An implement as claimed in claim 1 wherein said frame is a substantially horizontal rectilinear tube.

5. An implement as claimed in claim 1 comprising a traction beam coupled to said support beam.

6. An implement as claimed in claim 1, wherein said rake wheels have a normal direction of rotation, comprising tines on said rake wheels inclined oppositely to said direction of rotation.

References Cited in the file of this patent

UNITED STATES PATENTS

| | | |
|---|---|---|
| 2,680,343 | Enos | June 8, 1954 |
| 2,811,009 | Plant | Oct. 29, 1957 |

FOREIGN PATENTS

| | | |
|---|---|---|
| 244,004 | Great Britain | Dec. 10, 1925 |
| 303,174 | Switzerland | Feb. 1, 1955 |
| 1,104,540 | France | June 15, 1955 |
| 732,304 | Great Britain | June 22, 1955 |
| 1,104,989 | France | June 22, 1955 |